United States Patent [19]

Nash

[11] Patent Number: 5,301,779
[45] Date of Patent: Apr. 12, 1994

[54] FRICTION CLUTCH

[75] Inventor: Ian Nash, Warwick, Great Britain

[73] Assignee: Automotive Products, Plc, Leamington Spa, England

[21] Appl. No.: 934,450

[22] PCT Filed: Feb. 13, 1991

[86] PCT No.: PCT/GB91/00210
   § 371 Date: Sep. 8, 1992
   § 102(e) Date: Sep. 8, 1992

[87] PCT Pub. No.: WO91/14878
   PCT Pub. Date: Oct. 3, 1991

[30] Foreign Application Priority Data

Mar. 29, 1990 [GB] United Kingdom ............. 9007076

[51] Int. Cl.⁵ .............................................. F16D 13/68
[52] U.S. Cl. .............................. 192/70.2; 192/109 F
[58] Field of Search ............... 192/70.16, 70.19, 70.2, 192/70.21, 70.28, 109 R

[56] References Cited

U.S. PATENT DOCUMENTS

| | | |
|---|---|---|
| 1,573,217 | 2/1926 | Zetwo . |
| 2,174,316 | 9/1939 | Dunkelow . |
| 2,276,416 | 3/1942 | Nutt . |
| 4,425,994 | 1/1984 | Schele .................. 192/70.2 XR |
| 4,846,326 | 7/1989 | Tilton et al. ................ 192/70.19 |

FOREIGN PATENT DOCUMENTS

| | | | |
|---|---|---|---|
| 450230 | 8/1948 | Canada ....................... 192/109 R |
| 2528924 | 12/1983 | France . | |
| 2184812 | 7/1987 | United Kingdom . | |
| 2210677 | 6/1989 | United Kingdom . | |
| 2221281 | 1/1990 | United Kingdom . | |

Primary Examiner—Richard M. Lorence
Attorney, Agent, or Firm—Paul E. Milliken; Lee A. Germain

[57] ABSTRACT

A friction clutch includes a hub and driven plate assembly in which three carbon driven plates (60, 61, 62) are mounted on a hub (8), the hub (8) has radially outwardly extending splines (18) thereon and the driven plates have radially inwardly extending teeth (64) for engagement with the splines (18) such that the hub can slide axially relative to the driven plates (60, 61, 62) when the driven plates are held axially by driving plates (72, 74, 76, 78). Roll pins (30, 36, 38, 40) are each held in holes through two adjacent splines such that the roll pins are between the driven plates (60, 61, 62) and limit axial movement of the hub relative to the driven plates.

8 Claims, 4 Drawing Sheets

FRICTION CLUTCH

The present invention relates to friction clutches.

A known friction clutch includes a driven plate and hub assembly in which the hub has a plurality of radially extending fingers on either side of a circular web, the fingers extending axially from the web, and two carbon driven plates which have a plurality of radially extending slots such that the driven plates can be mounted on the hub, one on either side of the web, the fingers engaging with the slots such that the driven plates can move axially relative to the hub, but rotational movement of the driven plates relative to the hub is limited. When the assembly is included in a clutch the hub is mounted on an output shaft and the driven plates are positioned axially between, and coaxially with, annular driving plates. When the clutch is disengaged allowing limited axial separation of the driving plates axial movement of the driven plates is limited by the driving plates and axial movement of the hub is limited by engagement of the web with the driven plates.

The hub for such an assembly is complicated and expensive to manufacture.

The present invention provides a multi plate friction clutch assembly including a plurality of driven plates spaced apart by driving plates and arranged on a hub having a plurality of axially extending splines on the outer surface thereof, which splines engage with engaging means on the driven plates for rotation of the driven plates with the hub, and locating means formed separately from the hub and located in a cavity in the hub so that the locating means is arranged in the gap between a pair of adjacent spaced apart driven plates to limit axial movement of the driven plates relative to the hub.

Preferred embodiments of the present invention will now be described by way of example only with reference to the accompanying drawings in which:

FIG. 1 is a section through a hub of an assembly according to a first embodiment of the invention;

FIG. is a section on line II—II in FIG. 1;

Figure 1:
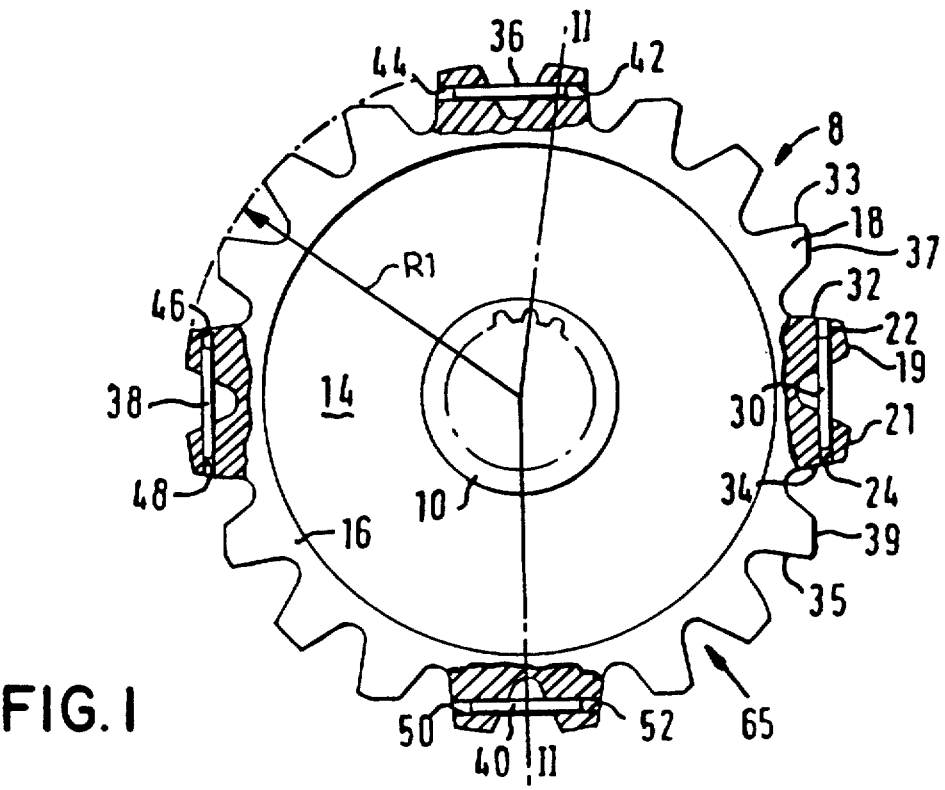
Figure 2:
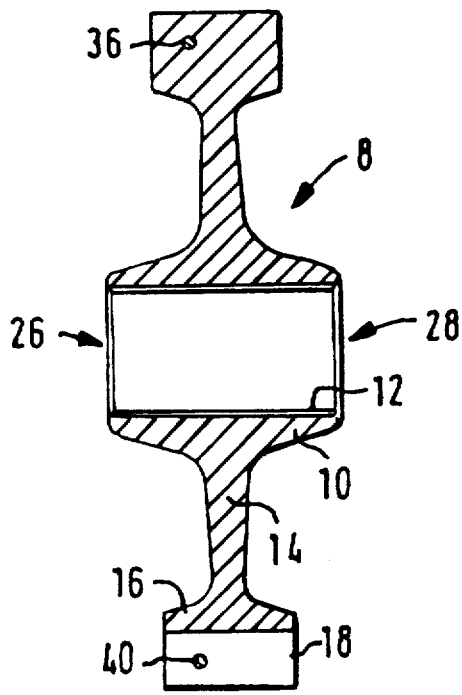

Referring to FIGS. 1 and 2 a hub 8 comprises an inner cylindrical portion 10 having grooves 12 in the inner surface thereof for engagement with a driven shaft (not shown).

Extending radially outwardly from the inner cylindrical portion 10 is an annular portion 14. An outer cylindrical portion 16 is supported on the outer edge of the annular portion 14. The inner and outer cylindrical portions 10,16 are coaxial and the annular portion 14 joins each of the cylindrical portion at a circle which is axially central thereon.

On the outer surface of the outer cylindrical portion 16 are a plurality of uniformly spaced axially extending splines 18 which are uniform over the whole length of the outer cylindrical portion. The shape of the splines 18 will be referred to below. In the illustrated example there are 20 splines but that number could be varied substantially.

Through each of two adjacent splines 19,21 is formed a hole 22,24. The holes 22,24 are aligned so as to be coaxial with each other and so as to extend in a direction parallel to a line tangential to the hub 8. The holes 22,24 are nearer to one end 26 of the hub 8 than the other end 28 thereof. A roll pin 30 has each end located in one of the holes 22,24. The pin 30 is dimensioned such that its ends 32,34 are flush with or below the surface of the splines 19,21 in which it is located. The splines 33,35 next to those 19,21 through which the roll pin 30 passes have truncated surfaces 37,39 respectively to allow the roll pin 30 to be inserted.

Three further pins 36,38,40 are located in holes 42,44,46,48,50,52 in further pairs of adjacent splines 18 and the pins 30,36,38,40 are spaced evenly around the hub. The pins 30,36,38,40 act as locating means as is described below.

Figure 4:
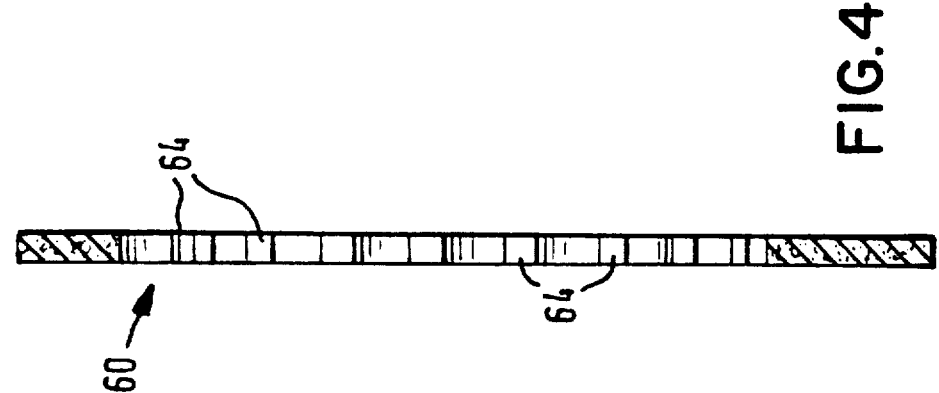
FIG. 4 is a section on line IV—IV of FIG. 3.
Figure 3:
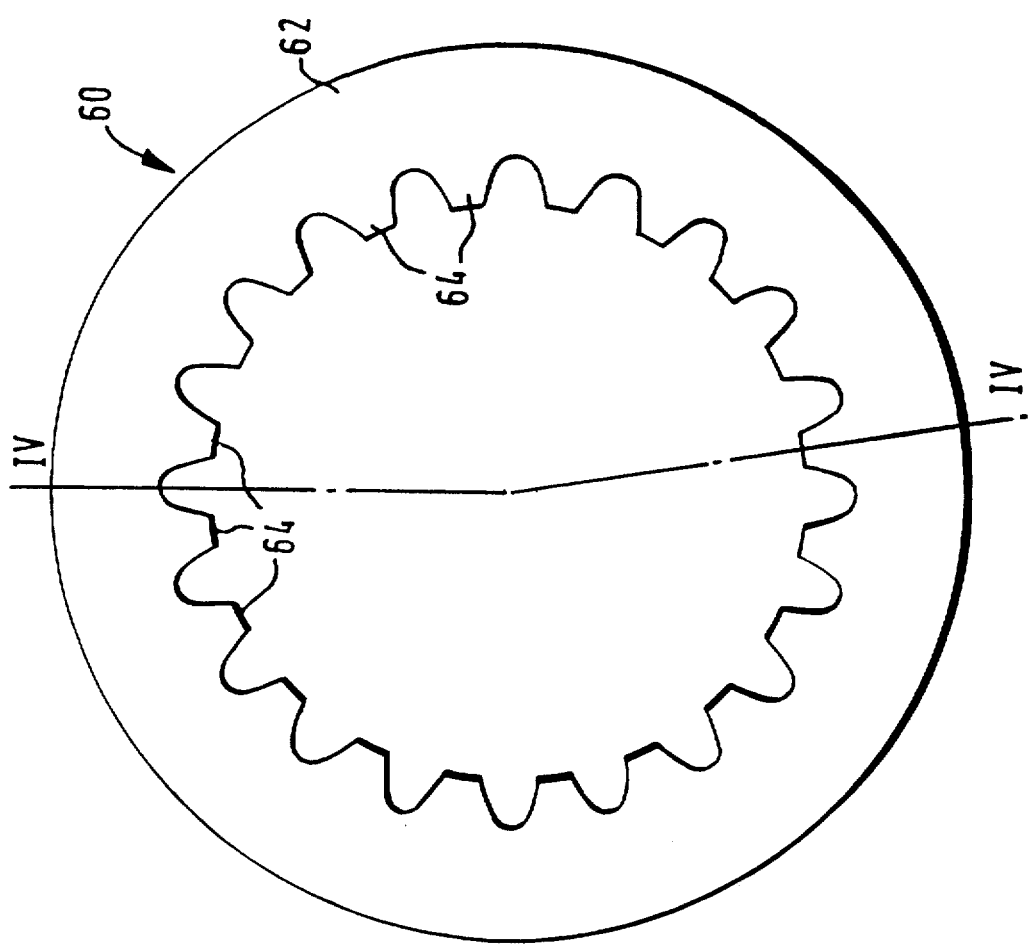
FIG. 3 is an elevation of a driven plate for use with the hub of FIG. 1.

Referring to FIGS. 3 and 4 a driven plate 60 for use with the hub 8 comprises an annular disk 62 of friction material having a plurality of teeth 64 protruding inwardly from the inner edge thereof. The teeth are shaped so as to be engageable with the splines 18 of the hub 8. The friction material used in this embodiment is carbon. Another suitable material would be carbon particles in a phenolic resin. Non-carbon friction materials could also be used. Alternatively the driven plate could comprise a metal carrier plate having a facing of friction material thereon.

Figure 5:
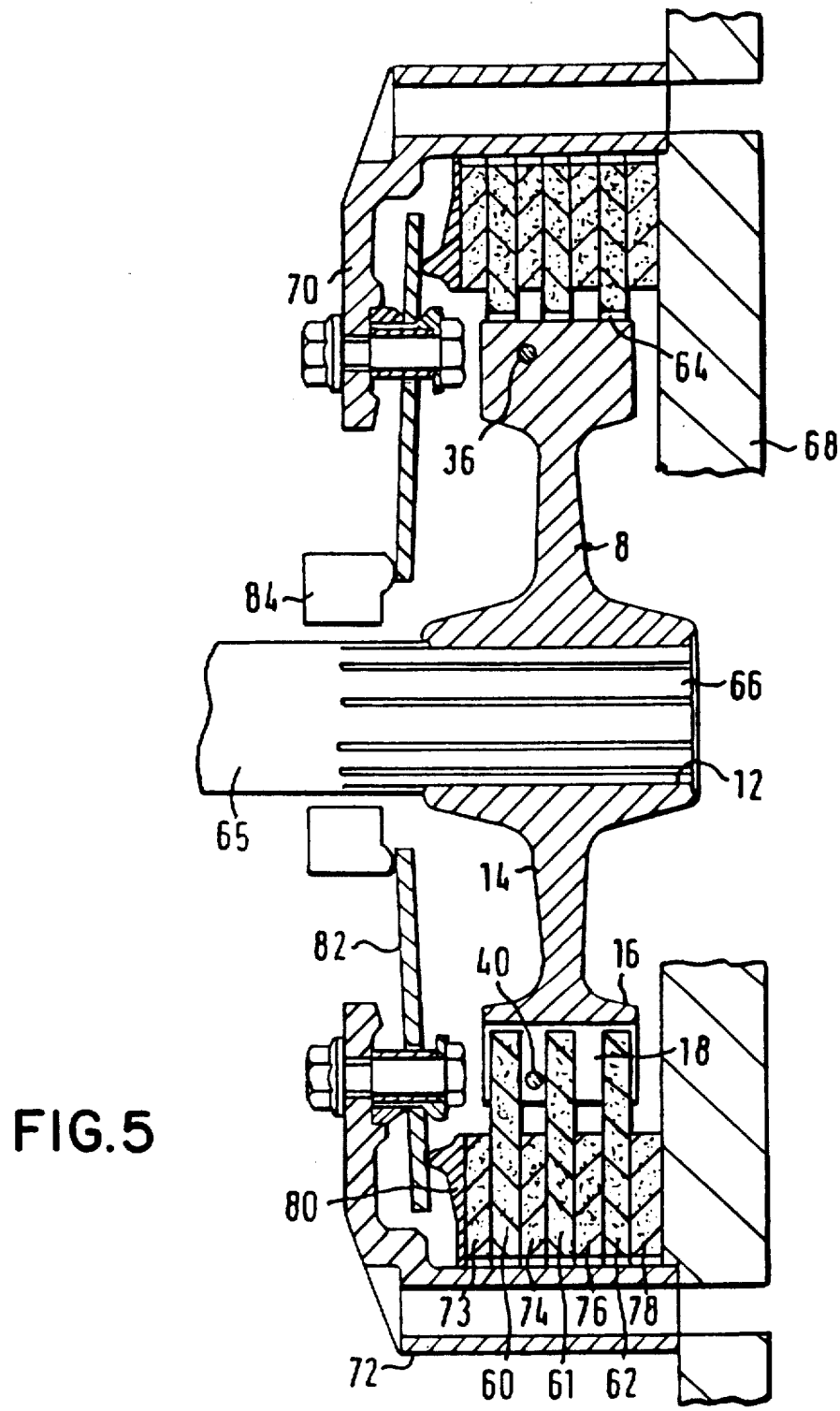
FIG. 5 is a section through a friction clutch incorporating the hub of FIG. 1 and the driven plate of FIG. 3.

Referring to FIG. 5, a hub and driven plate assembly according to the invention comprises the hub 8 of FIGS. 1 and 2 and three driven plates 60,61,62 as shown in FIGS. 3 and 4. The teeth 64 on the driven plates and the splines 18 on the hub form engaging means which limit rotational motion of the driven plates relative to the hub so that the driven plates can rotate the hub. The hub is mounted on an output shaft which has ridges 66 thereon to slideably engage the groves 12 in the hub 8. A flywheel 68 of an engine (not shown) and a clutch cover 70, are arranged coaxially with the hub, one on either side thereof and are held fixed relative to one another by a plurality of spacers 72 which are positioned radially beyond the driven plates 60,61,62. Four driving plates 73,74,76,78, each comprising an annular disk of friction material, are mounted on the spacers 72 between the flywheel 68 and the clutch cover 70. The driving plates 73,74,76,78 overlap with the driven plates 60,61,62 such that each driven plate 60,61,62 is between two of the driving plates 73,74,76,78. The driving plates are freely mounted on the spacers 72 so that they can slide axially thereon. A pressure plate 80 is mounted on the spacers 72 between the clutch cover and the driving plate 73 nearest thereto, and is also slideable axially along the spacers 72.

When the clutch is engaged a diaphragm spring 82 mounted on the clutch cover 70 urges the pressure plate 80 towards the flywheel thereby forcing the driving plates 73,74,76,78 into contact with the driven plates 60,61,62 to engage the clutch. The hub 8 can slide axially relative to the output shaft 65 and the driven plates 60,61,62, but its movement is limited by the roll pins 30,36,38,40 which are held between the driven plates 60,61,62 thus forming locating means for the hub 8.

To disengage the clutch a release bearing 84 is pushed against the diaphragm spring 82 which releases the pressure plate 80. The pressure plate 80, driving plates 73,74,76,78 and driven plates 60,61,62 can then move freely along the spacers 72. This allows the driving plates 73,74,76,78 to rotate relative to the driven plates 60,61,62. The hub 8 can still move axially relative to the driven plates 60,61,62 and the output shaft 65, and its movement is still limited by the roll pins 30,36,40.

As torque from the engine is transmitted to the output shaft via the splines 18 and the teeth 64, the teeth have to withstand high forces being applied to them. For a given torque and a given number of splines 18 the ends of which define a circle of given radius R1, the force applied to each tooth will decrease if the depth of the grooves 65 between the splines 18 decreases and the teeth 64 are made shorter. In the embodiment of FIG. 1 R1 is 52 mm and the grooves 65 are 7.67 mm deep. Also the teeth 64 are tapered towards their tips so that the force applied to the teeth by the splines 18 is not directed straight across the teeth, but slightly radially outwardly.

The roll pins can be arranged in various other ways and still work efficiently. They could each pass through only one of the splines 18 so as to protrude on either side thereof, or they could each pass through more than two splines. Also the orientation of the pins could be altered so that they were not perpendicular to the axis of the hub.

Figure 6:
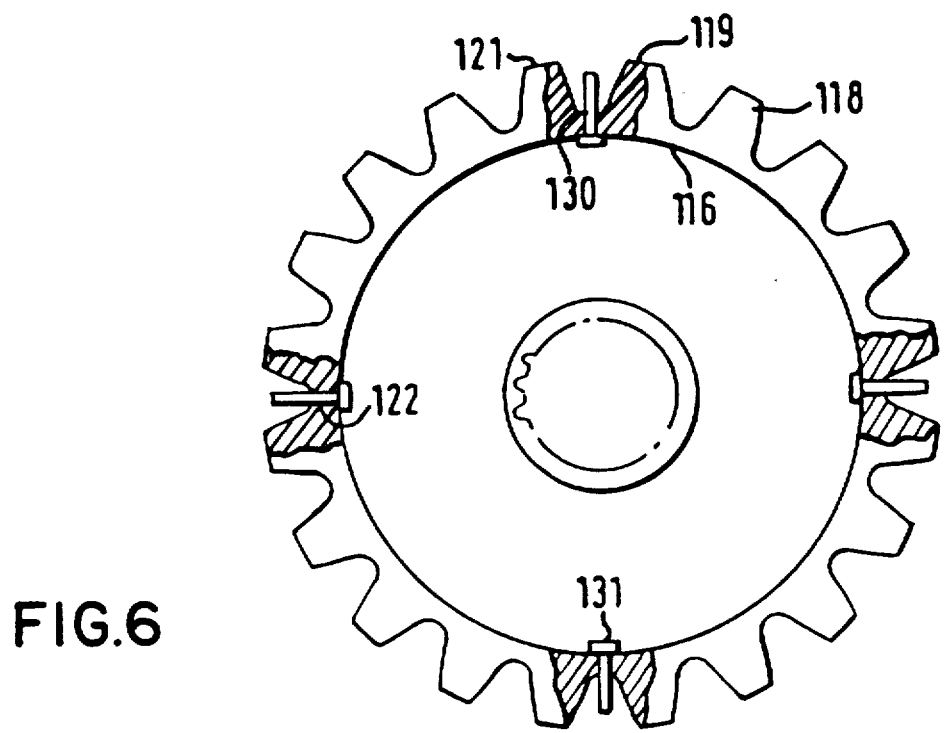
FIG. 6 is a section through a hub according to a second embodiment of the invention.

FIG. 6 shows the hub of a second embodiment of the invention in which the holes 122 into which the roll pins 130 are inserted are between two splines 119,121 and extend radially into the hub through the outer cylindrical portion 116. The pins 130 therefore protrude radially outwardly between the splines 118.

With radially extending pins it may be necessary to provide means to prevent the pins from slipping out of the hub as the hub rotates at high speed. In the embodiment shown in FIG. 6 this is done by providing the pins 130 with heads 131 on the inner end of the pin which protrudes from the inner surface of the outer cylindrical portion 116.

Figure 7:
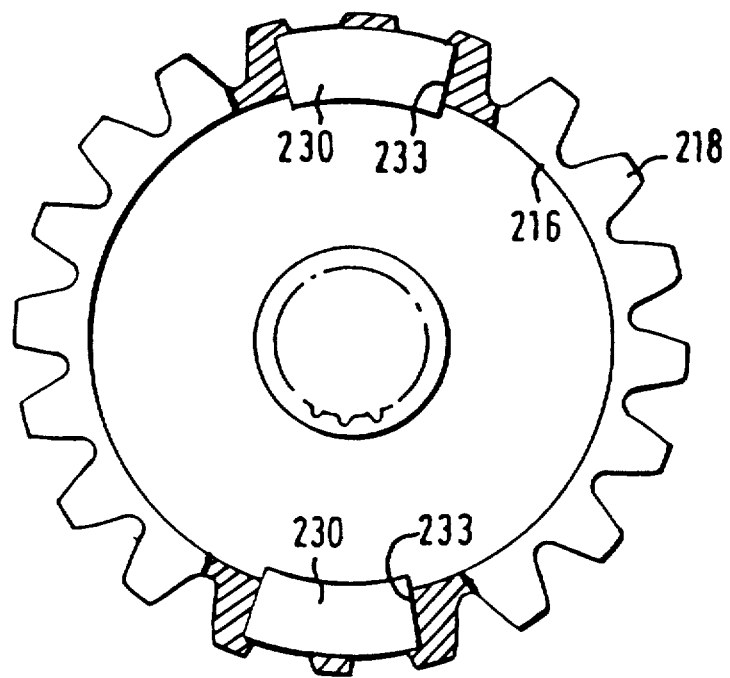
FIG. 7 is a section through a hub according to a third embodiment of the invention.

In the embodiment of FIG. 7 the locating means comprise two metal plates 230. To accommodate each plate a slot 233 is cut in the inner side of the outer cylindrical portion 216 which extends outwards into the splines 218.

In each of the embodiments described the locating means are positioned axially between the two ends of the hub. This can be advantageous if the assembly is to be fitted in a confined space in a clutch.

I claim:

1. A multi plate friction clutch assembly including a plurality of driven plates spaced apart by driving plates and arranged on a hub having a plurality of axially extending splines on the outer surface thereof, which splines are engageable with engaging means on the driven plates, for rotation of the driven plates with the hub, and locating means formed separately from the hub and located in a cavity in the hub said cavity extending into at least one of the splines thereof, so that the locating means is arranged in a gap between a pair of adjacent spaced apart driven plates to limit the axial movement of the driven plates relative to the hub.

2. An assembly according to claim 1 wherein each of two of the splines which are adjacent one another has a cavity therein, the cavities being aligned such that they can receive different parts of the locating means.

3. An assembly according to 2 wherein the cavity is a slot, and the locating means is a plate.

4. An assembly as claimed in claim 3 comprising a plurality of locating means arranged coaxially symmetrically around the hub.

5. An assembly according to claim 1 wherein the cavity is a bore extending parallel to a line tangential to the hub, and the locating means is a pin located in the cavity.

6. An assembly according to claim 5 comprising a plurality of locating means arranged coaxially symmetrically about the hub.

7. A multi plate friction clutch assembly including a plurality of driven plates spaced apart by driving plates and arranged on a hub having a plurality of axially extending splines on the outer surface thereof, which splines are engagable with engaging means on the driven plates, for rotation of the driven plates with the hub, and locating means formed separately from the hub and located in a cavity in the hub so that the locating means is arranged in a gap between a pair of adjacent spaced apart driven plates to limit the axial movement of the driven plates relative to the hub, and wherein the cavity is a bore extending radially of the hub and the locating means is a slidably extending pin located in said cavity.

8. An assembly as claimed in claim 7 comprising a plurality of locating means arranged coaxially symmetrically about the hub.

* * * * *